(12) United States Patent
Baek et al.

(10) Patent No.: US 10,373,015 B2
(45) Date of Patent: Aug. 6, 2019

(54) SYSTEM AND METHOD OF DETECTING MOVING OBJECTS

(71) Applicants: HANWHA TECHWIN CO., LTD., Seongnam-si (KR); HANWHA DEFENSE CO., LTD., Changwon-si, Gyeongsangnam-Do (KR); HANWHA PRECISION MACHINERY CO., LTD., Changwon-do (KR)

(72) Inventors: Youngmin Baek, Changwon-si (KR); Jikhan Jung, Changwon-si (KR); Jisung Kim, Changwon-si (KR)

(73) Assignees: HANWHA TECHWIN CO., LTD., Seongnam-si (KR); HANWHA DEFENSE CO., LTD., Changwon-si (KR); HANWHA PRECISION MACHINERY CO., LTD., Changwon-do (KR)

( * ) Notice: Subject to any disclaimer, the term of this patent is extended or adjusted under 35 U.S.C. 154(b) by 52 days.

(21) Appl. No.: 15/000,359

(22) Filed: Jan. 19, 2016

(65) Prior Publication Data

US 2016/0210759 A1    Jul. 21, 2016

(30) Foreign Application Priority Data

Jan. 19, 2015 (KR) .................. 10-2015-0008767

(51) Int. Cl.
*G06T 7/194* (2017.01)
*G06K 9/62* (2006.01)
*G06T 7/254* (2017.01)

(52) U.S. Cl.
CPC ............ *G06K 9/6202* (2013.01); *G06T 7/194* (2017.01); *G06T 7/254* (2017.01); *G06T 2207/20081* (2013.01); *G06T 2207/30232* (2013.01)

(58) Field of Classification Search
CPC . G06T 7/194; G06T 7/254; G06T 7/11; G06T 7/136; G06T 2207/10016;
(Continued)

(56) References Cited

U.S. PATENT DOCUMENTS 6,870,945 B2 * 3/2005 Schoepflin .............. G06T 7/254
348/169
7,379,594 B2 * 5/2008 Ferman .............. G06K 9/00456
382/173

(Continued)

FOREIGN PATENT DOCUMENTS

KR    10-2009-0044957 A    5/2009
KR    10-1192163 B1       10/2012
(Continued)

OTHER PUBLICATIONS

Kim et al, Real-time foreground—background segmentation using codebook model, Jun. 2005 [retrieved Sep. 28, 2018], Real-Time Imaging, vol. 11, Issue 3,pp. 172-185. Retrieved from the Internet: https://www.sciencedirect.com/science/article/pii/S1077201405000057.*

*Primary Examiner* — Andrew M Moyer
*Assistant Examiner* — Dennis Rosario
(74) *Attorney, Agent, or Firm* — Sughrue Mion, PLLC (57) ABSTRACT

Provided are a system and method of detecting moving objects. The system stores pixel information regarding each of pixels included in frames of the video in a storage, sets a background model comprising at least one background model element, the at least one background model element indicating at least one of a reference visual property and a reference usage time, determines whether the pixels are background pixels or foreground pixels by comparing the
(Continued)

pixel information with the at least one background model element, and updating the background model based on a result of the comparing.

14 Claims, 7 Drawing Sheets

(58) Field of Classification Search
CPC ...... G06K 9/38; G06K 9/4642; G06K 9/6212; G06K 9/00771
See application file for complete search history.

(56) References Cited

U.S. PATENT DOCUMENTS

| | | | |
|---|---|---|---|
| 7,489,817 B2* | 2/2009 | Toyama | G06K 9/38 382/173 |
| 7,688,997 B2* | 3/2010 | Gibbins | G06K 9/00771 348/143 |
| 8,098,888 B1* | 1/2012 | Mummareddy | G06K 9/00778 382/103 |
| 9,092,868 B2* | 7/2015 | Tojo | G06T 7/0081 |
| 9,105,104 B2* | 8/2015 | Nishino | G06K 9/38 |
| 9,152,243 B2* | 10/2015 | Gu | G06K 9/00208 |
| 9,280,833 B2* | 3/2016 | Brown | G06T 7/80 |
| 9,489,743 B2* | 11/2016 | Spector | G06T 7/60 |
| 10,032,282 B2* | 7/2018 | Cobb | G06K 9/00771 |
| 2012/0257053 A1* | 10/2012 | Gupta | H04N 7/181 348/143 |
| 2015/0169958 A1 | 6/2015 | Lee et al. | |

FOREIGN PATENT DOCUMENTS

| | | |
|---|---|---|
| KR | 10-1311148 B1 | 10/2013 |
| KR | 10-2014-0029069 A | 3/2014 |

* cited by examiner

SYSTEM AND METHOD OF DETECTING MOVING OBJECTS

CROSS-REFERENCE TO THE RELATED APPLICATION

This application claims priority from Korean Patent Application No. 10-2015-0008767, filed on Jan. 19, 2015, in the Korean Intellectual Property Office, the disclosure of which is incorporated herein in its entirety by reference.

BACKGROUND

1. Field

Methods and apparatuses consistent with exemplary embodiments relate to detecting moving objects, and more particularly, to detecting moving objects by determining a background pixel and a foreground pixel from a video captured by an imaging device.

2. Description of the Related Art

In the related art CCTV camera security technology, a manually operated physical security system is used. In such a system, after a video captured by a camera is transferred via a transmission network, a user manually monitors security circumstances through a monitor in real time or search through a recording medium storing recorded videos (e.g., a DVD) later.

However, due to the rapid increase in the number of CCTV cameras used in such a video security system, an enormous amount of human labor may be required to monitor required areas in real time or to analyze captured videos. Also, there is an increasing demand for a real-time monitoring system instead of a post-process monitoring system. Along with the rapid development of information technology, intelligent video surveillance systems that combine various technologies have been studied recently.

Intelligent video security technologies may be applied in various fields. For example, they may be used in national facilities, e.g., airports, military, harbors, roads, and bridges, as well as in subways, buildings, stadiums, parking lots, casinos, automobiles, mobile devices, etc.

A key feature of an intelligent video security system includes detecting a moving object in an input video, and lots of research has been conducted to improve the feature. In most research, a background modeling technology generates a model of a background in a unit of a pixel. This modeling method may be divided into parametric background modeling and non-parametric background modeling. One simple approach to implement the parametric background modeling includes calculating a time axis average of a background and detecting the input video based on difference between the input video and a background video. Another approach is Gaussian modeling which is expressed using an average and a variance.

However, a moving background (e.g., swaying trees or waves) is unlikely to be appropriately removed in the parametric background modeling, a method of using a plurality of models has been proposed. For example, a background probability may be statistically modeled by modeling a change in pixel values, which are sequentially input according to the Gaussian mixture model, with K Gaussian distributions.

SUMMARY

One or more exemplary embodiments may include a system and method of detecting moving objects. The system and method may use pixel information and time information and accurately model a background, and is capable of handling dynamic backgrounds and rapid changes in the backgrounds.

Various aspects will be set forth in part in the description which follows and, in part, will be apparent from the description, or may be learned by practice of the presented exemplary embodiments.

According to one or more exemplary embodiments, there is provided a system for detecting a moving object in a video which may include: at least one memory configured to store pixel information regarding each of pixels included in frames of the video; and at least one processor configured to implement: a background model setting unit which sets a background model including at least one background model element, the at least one background model element indicating at least one of a reference visual property and a reference usage time; a background pixel determining unit which determines whether the pixels are background pixels or foreground pixels by comparing the pixel information with the at least one background model element; and a background model updating unit which periodically updates the background model based on a result of the comparing.

The background model updating unit may delete a background model element that has not been used at least for a predetermined time period.

The background model updating unit may update the background model to include a peripheral area of the background model when at least one of the pixels has a video property corresponding to the peripheral area of the background model, the peripheral area representing a predetermined range of similarity to a visual property of the at least one background model element.

The background model updating unit may reduce the peripheral area included in the updated background model by a predetermined rate when no pixels corresponding to the peripheral area are detected for a predetermined time period.

The background model updating unit may store the usage time information in the at least one background model element according to the pixel information and updates the background model.

The usage time information may include: a first time element which identifies a most recent frame in which a corresponding background model element is used, a second time element which indicates a number of sequential frames in which the corresponding background model element is not used, and a third time element which indicates a number of frames in which the corresponding background model element is used.

The background model updating unit may generate at least one background model element candidate which includes, regarding a foreground pixel, pixel information and usage time information.

A number of the at least one background model element candidate may be smaller than a number of the at least one background model element.

The background model updating unit may update one of the at least one background model element candidate to one of the at least one background model element and delete a background model element that has not been used for the longest time among the at least one background model element, when a number of frames in which the one of the at least one background model element candidate is used is greater than a predetermined number.

The system pixel information may indicate at least one of brightness, color, and grayscale, and the background pixel determining unit may determine a pixel having a property corresponding to the pixel information as a background pixel.

According to one or more exemplary embodiments, there is provided a method of detecting a moving object in a video. The method may include storing pixel information regarding each of pixels included in frames of the video in a storage; setting a background model including at least one background model element, the at least one background model element indicating at least one of a reference visual property and a reference usage time; determining whether the pixels are background pixels or foreground pixels by comparing the pixel information with the at least one background model element; and updating the background model based on a result of the comparing.

The updating may include deleting a background model element that has not been used at least for a predetermined time period.

The updating may include updating the background model to include a peripheral area of the background model when at least one of the plurality of pixels has a video property that corresponds to a peripheral area of the background model, the peripheral area representing a predetermined range of similarity to the visual property of the at least one background model element.

The updating may include reducing the peripheral area by a predetermined rate when no pixels corresponding to the peripheral area are detected for a predetermined time period.

The updating may include storing the usage time information in the at least one background model element according to the pixel information and updating the background model.

The usage time information may include: a first time element which identifies a most recent frame in which a corresponding background model element is used, a second time element which indicates a number of sequential frames in which the corresponding background model element is not used, and a third time element which indicates a number of frames in which the corresponding background model element is used.

The updating may include generating at least one background model element candidate which includes, regarding a foreground pixel, pixel information and usage time information.

A number of the at least one background model element candidates may be smaller than a number of the at least one background model element.

The updating may include, when a number of frames in which the one of the at least one background model element candidate is used is greater than a predetermined number, updating one of the at least one background model element candidate to one of the at least one background model element and deleting a background model element that has not been used for the longest time among the at least one background model element.

The pixel information may indicate at least one of brightness, color, and grayscale, and the determining may include determining a pixel having a property corresponding to the pixel information as a background pixel.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Reference will now be made in detail to the exemplary embodiments, examples of which are illustrated in the accompanying drawings, wherein like reference numerals refer to the same elements throughout. As used herein, the term "and/or" includes any and all combinations of one or more of the associated listed items. Expressions such as "at least one of," when preceding a list of elements, modify the entire list of elements and do not modify the individual elements of the list.

Figure 1:
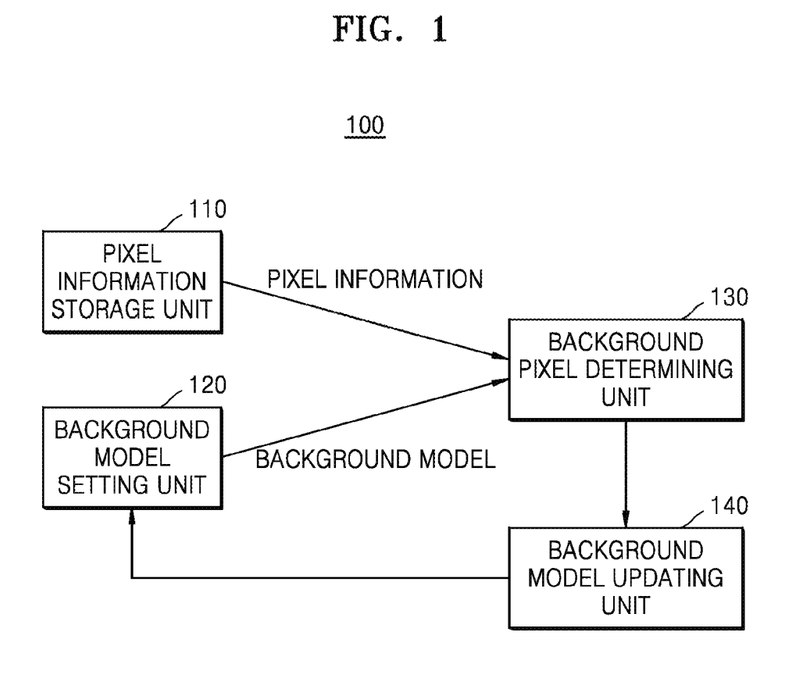
FIG. 1 is a schematic block diagram illustrating a system for detecting a moving object according to an exemplary embodiment.

FIG. 1 is a schematic block diagram of a system 100 for detecting a moving object according to an exemplary embodiment.

Referring to FIG. 1, the system 100 according to an exemplary embodiment may include a pixel information storage unit 110, a background model setting unit 120, a background pixel determining unit 130, and a background model updating unit 140.

The pixel information storage unit 110 may store pixel information regarding each pixel in the frames of a video, which may be input to the system 110 by an imaging device. The imaging device may include a video camera or a surveillance camera. The imaging device may be installed outside the system 100 and provide a captured video to the system 100. Also, the imaging device may be have a fixed location, and its location or capturing direction maintains until a user otherwise operates the imaging device. The pixel information storage unit 110 may be implemented using at least one memory.

The imaging device may be connected to the system 100 and communicate with the system 100 in a wired or wireless manner. Alternatively, the imaging device may be included in the system 100.

The video provided by the imaging device may include a plurality of frames per time unit. For example, the video may include 60 frames per second (FPS) or 120 FPS. The number of frames may vary depending on performance of the imaging device or system settings configured by the user. The number of frames is not limited to a predetermined number.

Each of the frames of the video may include a plurality of pixels. One frame may include m pixels in a horizontal line and n pixels in a vertical line, hence a total of m×n pixels.

Each of the pixels may divide a screen captured by imaging device by the number of pixels and display different colors, brightness, and grayscale.

The pixel information storage unit 110 may store pixel information regarding a pixel, for example, color information, brightness information, and grayscale information, etc. The pixel information storage unit 110 may be implemented using various types of storage devices that may store data and communicate with the imaging device.

The background model setting unit 120 sets a background model for determining whether a pixel in each of the frames of the video is a background pixel. The video provided by the imaging device, i.e., input video, may include at least one object. The at least one object may be determined as a 'foreground' which is in motion or as a 'background' which is stationary. For example, automobiles and people may be determined as a foreground, and buildings, trees, traffic lights, and roads may be determined as a background.

The background model may include video property information indicating video property (visual property) of the model, such as colors, grayscale, and brightness, etc., which is expected to be included in the pixels of a background. Therefore, the background model may function as a reference for determining whether the object expressed by the pixels is a background.

The background model may include at least one background model element which includes at least one of video property information and usage time information. The video property information or/and the usage time information may used as a reference for determining whether the pixels of the video is background or foreground. Thus, the background model element is an element that configures the background model.

As aforementioned, the video property information may include, but is not limited to, color information, brightness information, grayscale information. The video property information may vary according to different properties of backgrounds.

The usage time information is related to a frame of the input video, and may include information on a frame in which the corresponding background model element is used. For example, the usage time information may include one of information regarding the number of frames in which the background model element is used, information regarding a recent frame in which the background model element is used, and information regarding the number of sequential frames in which the background model elements are not used.

The background pixel determining unit 130 may compare pixel information regarding a pixel and a background model, and determine whether the pixel is a background pixel or a foreground pixel. The background pixel determining unit 130 may compare the background model set by the background model setting unit 120 with pixel information stored in the pixel information storage unit 110, and determine whether each of the pixels is included in the background or the foreground.

Each of the background model and the pixel information may include video property information representing video property such as color, brightness, grayscale, etc. If the video property information matches between the pixel information regarding a pixel and a background model, the background pixel determining unit 130 determines the pixel as a background pixel. Alternatively, if the video property information regarding the pixel information and the background model does not match, the background pixel determining unit 130 determines the pixel as a foreground pixel.

The system 100 may detect a moving object. The moving object may be expressed by one or more pixels, which may be determined as foreground pixels by the background pixel determining unit 130.

The background pixel determining unit 130 may determine whether each of the pixels is a background pixel or a foreground pixel. If a pixel is determined as a background pixel, the background pixel determining unit 130 may generate element identification information indicating that the background model element corresponding to the pixel has been used.

The background model updating unit 140 may periodically update the background model based on the element identification information generated by the background pixel determining unit 130. Specifically, the background model updating unit 140 may update video property information and usage time information regarding a corresponding background model element, based on the element identification information provided by the background pixel determining unit 130. The updated information may be provided to the background model setting unit 120, and may be used to determine whether a plurality of pixels of a following frame are background pixels or foreground pixels.

The usage time information may include a first time element which is information identifying the most recent frame in which a corresponding background model element is used, a second time element which is information indicating the number of sequential frames in which the corresponding background model element is not used, and a third time element which is information indicating the number of frames in which the corresponding background model element is used.

The video provided by the imaging device may include a plurality of frames. For example, when using a 60 FPS imaging device, a video provided by the imaging device includes 60 frames per second. In this case, the number of frames in the video may be counted from the beginning of the operation of the system 100. A 5-second video may include 300 frames numbered 1 to 300.

For example, suppose that a 60 FPS video is used, a frame number of a currently processed frame is 1200, and a value of the first time element is 900. In this case, it may be determined that the background model element has not been used between a time point 15 second and 20 second on a time line. As a result, a background corresponding to the background model element may be determined as a dynamic background which has not appeared since the time point of 15 second.

As another example, suppose a frame number of a currently processed frame is 1200 and a value of the second time element is 600. In this case, it may be determined that the background model element has not been used for a period of 10 seconds somewhere within the 20 seconds.

As another example, suppose a frame number of a currently processed frame is 1200 and a value of the third time element is 300. In this case, it may be determined that a total usage time of the background model element is 5 seconds.

The first to third time elements may be included in the usage time information, which may be an important reference for updating the background model (or the background model element). This will be described in more detail below with reference to FIGS. 2A to 4. In the following examples, the background model elements are assumed to be distinguished based on grayscale information. However, other visual property, e.g., color, brightness, etc., may be used to characterize background model elements or pixels, according to an exemplary embodiment.

Figure 2A:
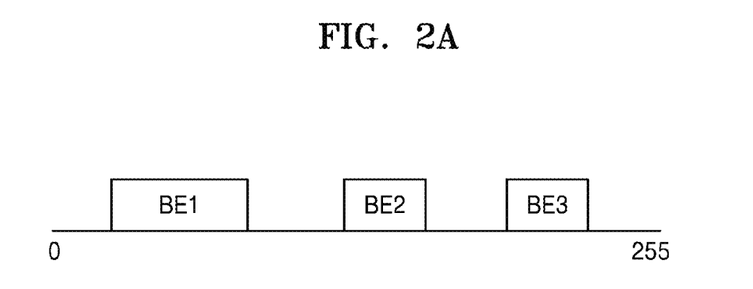
FIGS. 2A and 2B are diagrams illustrating a background model according to an exemplary embodiment.
Figure 2B:
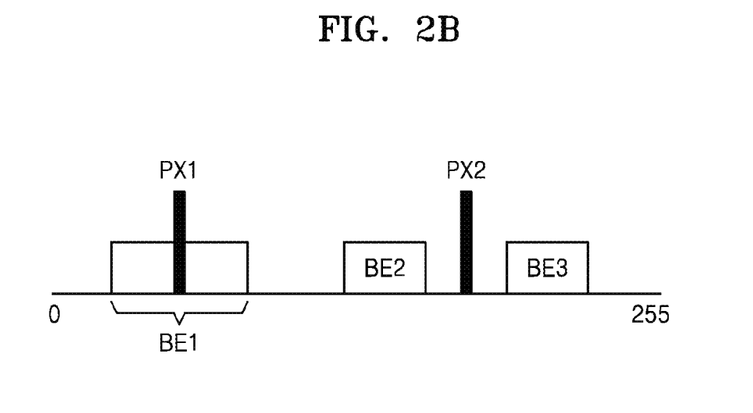

FIGS. 2A and 2B are diagrams illustrating a background model.

FIGS. 2A and 2B show a first background model element BE1, a second background model element BE2, and a third background model element BE3.

Referring to FIG. 2A, the background model elements BE1 to BE3 include different grayscale ranges. The first background model element BE1 includes the greatest grayscale range, and the third background model element BE3 includes the smallest grayscale range. The background model elements BE1 to BE3 may be used in a single background model. Every background model may include at least one background model element, but the number of background elements used in a single background model may vary, according to an exemplary embodiment.

The background model (or the background model element) may be automatically set by the system 100 or manually set by the user.

If a video camera or a surveillance camera that is fixed to a certain location is used as the imaging device, the user may not have to set the background model until a predetermined period of time. Instead, during the predetermined period of time, a video provided by the imaging device may be analyzed and set the background model using pixel information regarding pixels which are determined as a background, i.e., pixels of which video property such as colors, grayscale, etc. do not change over time.

For example, if the video includes building, trees, and roads, a background model may be set to have a certain range of colors and grayscale based on colors and grayscale information regarding pixels that express the buildings, the trees, and the roads.

Therefore, the number of background model elements may vary depending on a type of a background in the video provided by an imaging device. In some cases, there may be only one background model element. As aforementioned, the background model may be used the background pixel determining unit 130 as a reference to determine whether pixels in the video are background pixels or foreground pixels.

FIG. 2B is a diagram illustrating a background pixel and a foreground pixel according to an exemplary embodiment. Although FIG. 2B shows two pixels, i.e., a first pixel PX1 and a second pixel PX2, the number of pixels may vary depending on resolution of the imaging device.

Referring to FIG. 2B, grayscale of the first pixel PX1 is within the grayscale range of the first background model element BE1, whereas grayscale of the second pixel PX2 is not within a grayscale range of any one of the first to third background model elements BE1 to BE3. Therefore, the first pixel PX1 may be determined as a background pixel, and the second pixel PX2 may be determined as a foreground pixel.

Also, the first background model element BE1 may be updated as a background model element that is used in a recent frame, and the second and third background model elements BE2 and BE3 are updated as background model elements that are not used in the recent frame.

Figure 3A:
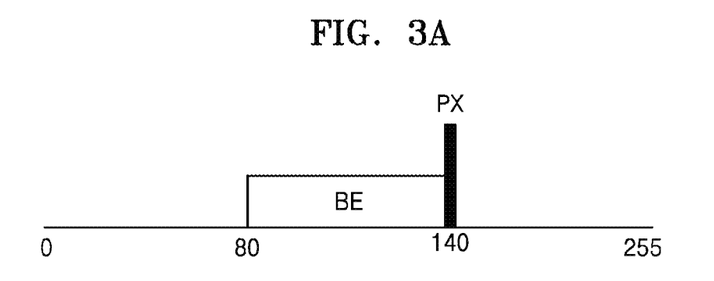
FIGS. 3A and 3B are diagrams illustrating an extended background model according to an exemplary embodiment.
Figure 3B:
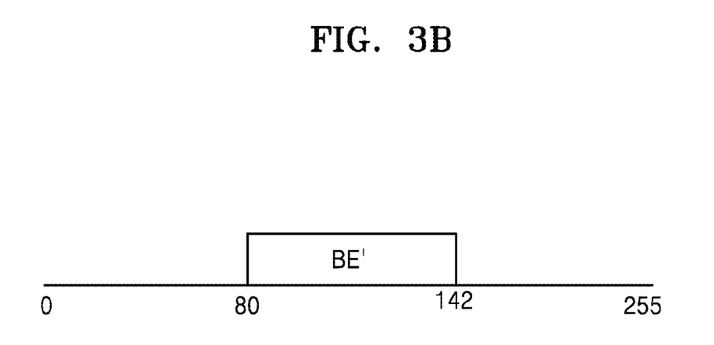

FIGS. 3A and 3B are diagrams illustrating an extended background model according to an exemplary embodiment.

FIG. 3A shows a background model including one background model element BE. As aforementioned, the number of background model elements may be different by system design.

Referring to FIG. 3A, there is a pixel that corresponds to a peripheral area of the background model element BE having a grayscale range of 80 to 140. A "peripheral area" of a background model element may refer to a minimum value or a maximum value of a range of the background model element. Alternatively, the peripheral area may refer to a certain range of grayscale which is adjacent to the range of the background model element, overlapping the minimum value or the maximum value. In other words, a peripheral area of a background model element represents visual property having a predetermined range of similarity to the visual property of the background model element.

For example, in FIG. 3A, the peripheral area of the background model element BE may be grayscale 80 or/and grayscale 140. Alternatively, the peripheral area may be a grayscale range including grayscale 80, e.g., a grayscale range of 78 to 82, or/and a grayscale range including grayscale 140, e.g., a grayscale range of 138 to 142.

When there is a pixel having a video property corresponding to the peripheral area of the background model element, the background model updating unit 140 may update the background model element to include the peripheral area.

FIG. 3B shows a background model element BE' that is obtained by updating the background model element BE of FIG. 3A. Referring to FIG. 3B, the background model element BE' has a grayscale range of 80 to 142, which indicates that the background model element BE of FIG. 3A has been extended to include higher values of grayscale. That is, due to a pixel PX having a video property that corresponds to the peripheral area of the background model element BE (a grayscale range of 138 to 142), the background model element BE is updated to include the peripheral area and thus the updated background model element BE' is generated.

The background model updating unit 140 may update video property information regarding a background model element as shown in FIGS. 3A and 3B, and also update usage time information regarding the updated background model element BE'. Therefore, in FIG. 3B, information identifying a recent frame in which the background model element BE' is used may be updated. The background model updating unit 140 may periodically update the background model (or the background model element).

On the other hand, the background model updating unit 140 may reduce the extended background model (or the peripheral area) by a predetermined rate when a pixel corresponding to an extended peripheral area does not exist (is not input) for a predetermined time period, so as to prevent excessive extension of the background model.

Figure 4A:
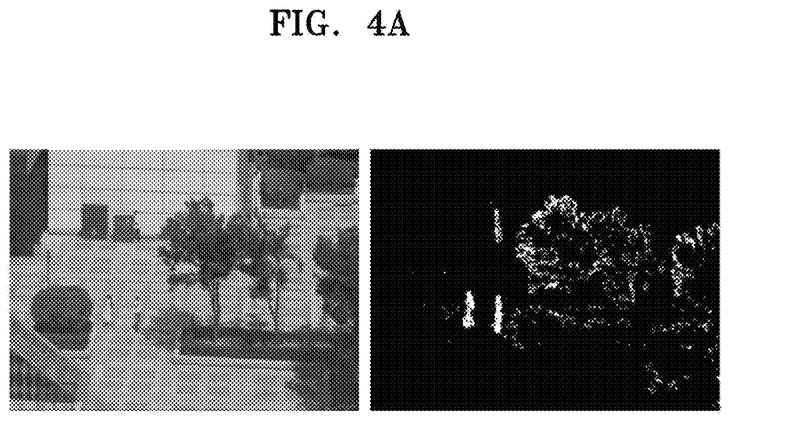
FIGS. 4A and 4B illustrate a method of using a background model without extension, according to an exemplary embodiment.
Figure 4B:
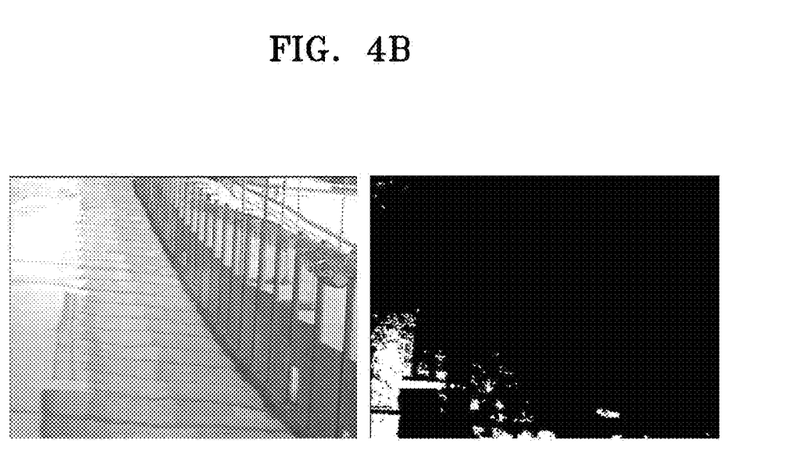

FIGS. 4A and 4B illustrate a method of using a background model without extension, according to an exemplary embodiment.

Specifically, FIGS. 4A and 4B show a video provided by an imaging device, and a screen that distinguishably shows a background and a foreground in the video. A right side image of FIGS. 4A and 4B is a screen that distinguishes a background and a foreground regardless of a background model extension, i.e., an extension of a background model element by a peripheral area. Bright pixels in the right images of FIGS. 4A and 4B are the pixels determined as the foreground.

Referring to FIG. 4A, pixels expressing people are determined as the foreground and thus brightly displayed. Although trees and shadows of the trees may be likely determined as a background, some pixels of the trees and the shadows may be determined as the foreground and brightly displayed as shown in FIG. 4A. Referring to FIG. 4B, although most pixels are determined as the background, some pixels are determined as the foreground and thus brightly displayed.

In FIG. 4A, some pixels may be determined as the foreground because of a change in video property of the pixels. For example, pixels of the leaves and the tree shadows or near the leaves and the tree shadows may have a varying video property for a short time period as a wind blows swaying the leaves. In FIG. 4B, shadows of clouds passing by may have hindered accurate distinguishing of the background and the foreground.

Therefore, if a wind blows or an area is covered by shadows, there may be a pixel having video property information corresponding to a peripheral area of a current background model element. If such a pixel exists, the current background model element may be updated to include the peripheral area. As a result, adaptability to a quickly changing dynamic background may be improved by such an update process described above with reference to FIGS. 3A and 3B.

Figure 5:
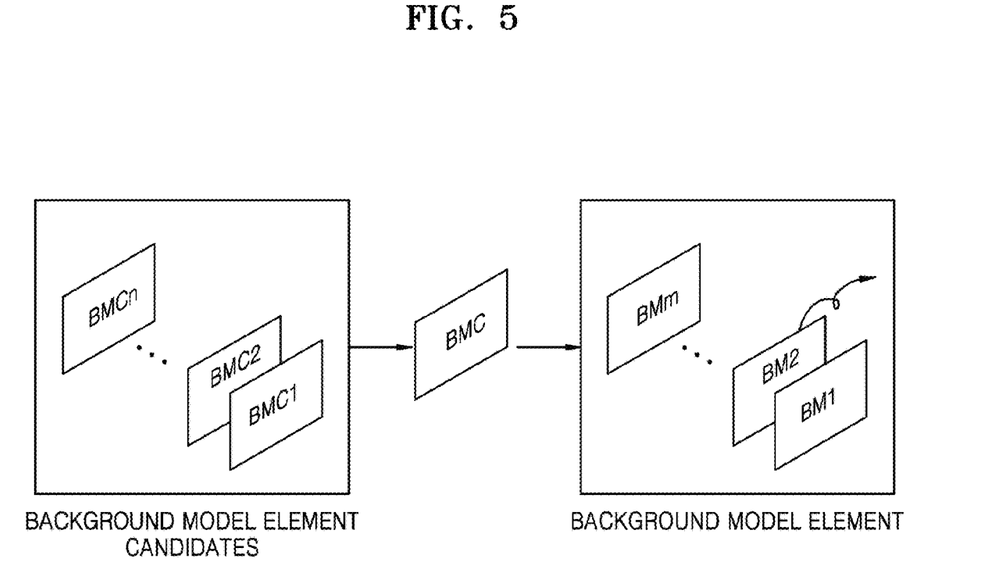
FIG. 5 is a schematic diagram illustrating a method of updating a background model, according to an exemplary embodiment.

FIG. 5 is a schematic diagram illustrating a method of updating a background model, according to an exemplary embodiment.

Specifically, FIG. 5 shows that a background model element candidate may be updated to a background model element. A "background model element candidate" refers to a model element that may be updated to a background model element later on. In other words, the background model element candidate is a model element having a video property of a pixel which has been determined as a foreground pixel but may be determined as a background pixel over time. For example, a car parked in a parking lot may be determined as a foreground at first, but when the car is parked for a long-term, the car may be determined as a background. Therefore, pixels that display the car may be determined as foreground pixels, but simultaneously, classified as a background model element candidate so that the pixels may be determined as background pixels later on.

In FIG. 5, BMC indicates a background model element candidate, and BM indicates a background model element. Each of background model element candidates BMC and BMC1 to BMCn may include pixel information and usage time information regarding pixels that are determined as foreground pixels by the background pixel determining unit 130. The background model updating unit 140 may generate a background model element candidate that includes the pixel information and the usage time information regarding the pixels determined as the foreground pixels.

As aforementioned, each of the background model element candidates BMC1 to BMCn may include usage time information, like the background model element. Therefore, the background model element candidate may include pixel information regarding a pixel determined as a foreground pixel, information regarding the number of frames in which the pixel is used as a foreground pixel, information regarding a recent frame in which the pixel is used as the foreground pixel, and information regarding the number of sequential frames in which the background model elements are not used.

When a pixel that corresponds to a video property of a background model element candidate is included in more than a predetermined number of sequential frames, the background model updating unit 140 may update the background model element candidate to a background model element. For example, if the predetermined number is set to 108,000 in a 60 FPS video, a foreground existing for at least 30 minutes is updated to a background. Thus, if a car that is parked for 30 minutes or longer in the video, the car is updated from a foreground to a background. The predetermined number may be flexibly set according to an exemplary embodiment.

Accordingly, if the number of frames in which a background model element candidate is used is greater than the predetermined number of frames, the background model updating unit 140 may update the background model element candidate to a background model element, and delete a background model element that has not been used for the longest time.

Referring to FIG. 5, there are n background model element candidates BMC1 to BMCn and m background model elements BM1 to BMm. From among the n background model element candidates BMC1 to BMCn, when one of the background model element candidates, BMC, is updated to a background model element, a background model element BM2 may be deleted from the m background model element BM1 to BMm.

The deleted background model element BM2 may be a background model element that has not been used for the longest time from among the m background model elements BM1 to BMm. In other words, the background model element BM2 may be a background model element that has the largest second time element among the m background model elements BM1 to BMm.

Also, the number n of the background model element candidates may be set to be smaller than the number m of the background model elements. This may be beneficial to the system because the background model element candidate is fundamentally a 'foreground.' Specifically, since the foreground usually disappears after being detected once, continuously tracing the foreground using many model elements may cause a system overload and thus may be undesirable.

Figure 6A:
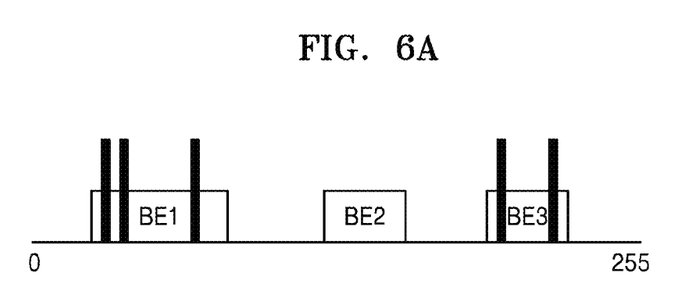
FIGS. 6A and 6B are diagrams illustrating a method of deleting a background model element, according to an exemplary embodiment.
Figure 6B:
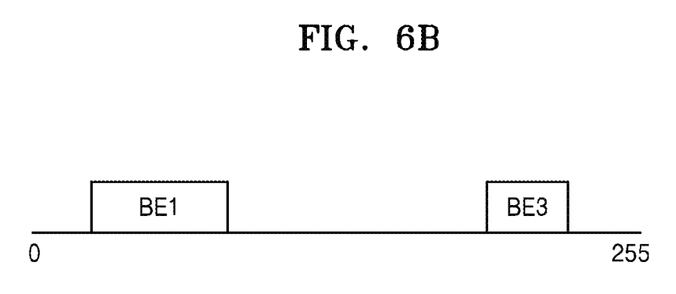

FIGS. 6A and 6B are diagrams illustrating a method of deleting a background model element, according to an exemplary embodiment.

FIG. 6A shows three background model elements BE1, BE2, and BE3, and five pixels. Referring to FIG. 6A, the background model elements BE1, BE2, and BE3 include different grayscale ranges. The five pixels are included in a frame of a video provided by an imaging device. Three pixels correspond to the first background model element BE1, two pixels correspond to the third background model element BE3, and no pixels correspond to the second background model element BE2. Since each of the five pixels corresponds to a background model element, all pixels are determined as background pixels.

If frames that do not have a pixel corresponding to a specific background model element, e.g., BE2, are continuously inputted, i.e., if a value of the second time element of the background model element gradually increases as a non-usage period of the background model element increases, the background model element may be determined as being no longer appropriate as a background model element.

When a background model element is determined to be inappropriate, the background model element may be deleted from a background model. Further, a background model element candidate with a high usage frequency may be updated to a background model element. For example, as shown in FIG. 6B, a second background model element BE2 may be deleted. A length of non-usage period, which may be used as a reference for determining a background model element to be deleted, may be flexibly determined based on the usage purpose of the system 100 or the user's intension.

Figure 7:
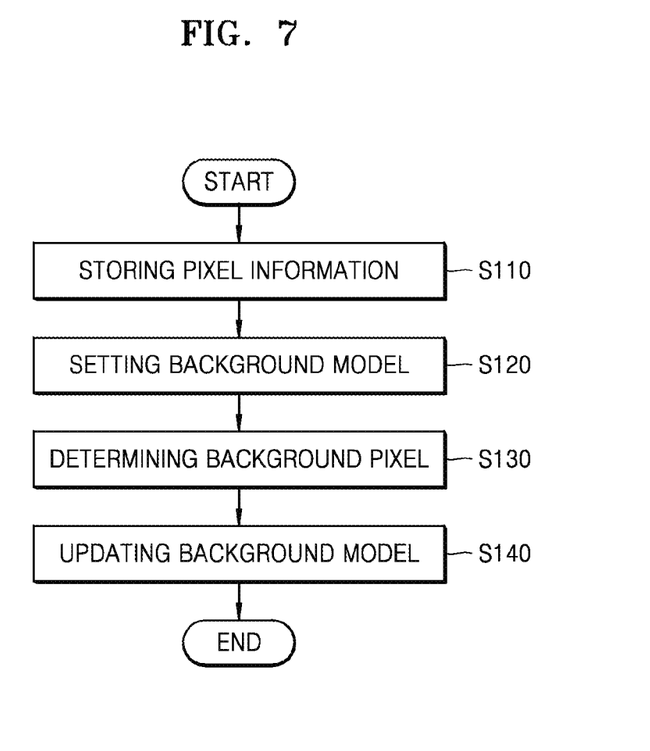
FIG. 7 is a schematic flowchart illustrating a method of detecting a moving object in a video, according to an exemplary embodiment.

FIG. 7 is a schematic flowchart illustrating a method of detecting a moving object in a video, according to an exemplary embodiment.

Referring to FIG. 7, the method according to an exemplary embodiment may include storing pixel information (S110), setting a background model (S120), determining whether a background pixel is included (S130), and updating the background model (S140).

In operation S110, pixel information for each frame of a video provided by an imaging device may be stored in a storage. As described with reference to FIG. 1, the imaging device may be a video camera or a surveillance camera that is fixed to a certain location and provides information regarding an object appearing in a viewing angle.

The video provided by the imaging device may have a plurality of frames per second. The number of the frames may vary according to performance of the imaging device or user's settings. Each of the frames may include a plurality of pixels. Also, each of the pixels may include video property information indicating video property of the video, such as color, grayscale, brightness, etc. Thus, the storing of the pixel information may include storing the video property information for each of the pixels.

In operation S120, a background model for determining whether the pixels in each of the frames in the video are background pixels may be set. The background model may include at least one background model element. The background model element may include at least one of video property information and usage time information.

The video property information in the background model element may indicate the video property, i.e., visual property, of each of the pixels. For example, the video property information may indicate color, grayscale, brightness, etc. The usage time information may be an important reference for determining whether a background model element is for a dynamic background or a stationary background. Also, it may be determined whether the background model element is a significant element based on the usage time information. Specifically, the determining may be performed by based on a usage frequency of the background model element, i.e., an input frequency of a pixel corresponding to the background model element.

Since the background model element may be predetermined before the video is received from the imaging device, the setting of the background model (S120) may be performed before the storing of the pixel information (S110).

In operation S130, it may be determined whether the pixels are background pixels or foreground pixels by comparing the pixel information and the background model.

When the at least one background model element in the background model and the pixels include corresponding video property information, the pixels are determined as background pixels, and if not, the pixels are determined as foreground pixels.

In operation S140, the background model that is used as a reference for determining background pixels may be periodically updated. Further, a background model element that has not been used at least for a predetermined time may be deleted.

Also, when there is a pixel having a video property corresponding to a peripheral area of the background model (or the background model element) in the video, the background model (or the background model element) may be updated to include the peripheral area.

The updating of the background model (S140) may include generating a background model element candidate that includes pixel information and usage time information regarding a pixel determined as a foreground pixel. The usage time information may be information related to a frame including the pixel. For example, the usage time information may indicate a frame number identifying a frame including the pixel from among the frames of the video provided by the imaging device.

When the number of the background model element candidates may be smaller than the number of the background model elements. If the number of frames in which a background model element candidate is used is greater than a predetermined number of frames, the background model element candidate may be updated to a background model element. Further, a background model element that has not been used for the longest time among the background model elements may be deleted.

The usage time information in the background model element may include a first time element which is information identifying the most recent frame in which the background model element is used, a second time element which is information indicating the number of sequential frames in which the background model element is not used, and a third time element which is information indicating the number of frames in which the background model element is used.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIG. 1 (e.g., the background model setting unit 120, the background pixel determining unit 130, and/or the background model updating unit 140) may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A system for detecting a moving object in a video, the system comprising:
   at least one memory configured to store pixel information regarding each of pixels included in frames of the video; and
   at least one processor configured to implement:
      a background model setting unit which sets a background model comprising at least one background model element, the at least one background model element indicating a reference visual property and a usage time;
      a background pixel determining unit which determines whether the pixels are background pixels or foreground pixels by comparing pixel information of a first frame with the at least one background model element, and detects a moving object in the first frame based on pixels which are determined to be the foreground pixels according to the comparing; and
      a background model updating unit which periodically updates the background model based on a result of the comparing,
   wherein the background model updating unit
      expands a range of the reference visual property to include a peripheral video property range when the compared pixel information corresponds to the peripheral video property range, the peripheral video property range representing a visual property range that does not belong to and is adjacent to the range of the reference visual property before the range of the reference visual property is expanded;
      generates at least one background model element candidate comprising pixel information and usage time information of one of the foreground pixels which has a predetermined visual property; and
      when a number of frames in which one of the at least one background model element candidate is used is greater than a predetermined number, updates the one of the at least one background model element candidate to one of the at least one background model element and deletes a background model element that has not been used for a longest time in the background model, and
   wherein the background pixel determining unit detects a moving object in a second frame by comparing pixel information of the second frame with the expanded range of the reference visual property.

2. The system of claim 1, wherein the background model updating unit deletes a background model element that has not been used at least for a predetermined time period in the background model.

3. The system of claim 1, wherein the background model updating unit reduces the peripheral video property range included in the expanded range of the reference visual property by a predetermined rate when no pixels corresponding to the peripheral video property range are detected for a predetermined time period.

4. The system of claim 1, wherein the background model updating unit updates the usage time in the at least one background model element according to the compared pixel information.

5. The system of claim 4, wherein the usage time comprises:
   a first time element which identifies a most recent frame in which a corresponding background model element is used,
   a second time element which indicates a number of sequential frames in which the corresponding background model element is not used, and
   a third time element which indicates a number of frames in which the corresponding background model element is used.

6. The system of claim 1, wherein a number of the at least one background model element is greater than one, and
   wherein a number of the at least one background model element candidate is smaller than the number of the at least one background model element.

7. The system of claim 1, wherein the reference visual property indicates at least one of brightness, color, and grayscale.

8. A method of detecting a moving object in a video, the method comprising:
   storing pixel information regarding each of pixels included in frames of the video in a storage;
   setting a background model comprising at least one background model element, the at least one background model element indicating a reference visual property and a usage time;
   determining whether the pixels are background pixels or foreground pixels by comparing pixel information of a first frame with the at least one background model element;
   detecting a moving object in the first frame based on pixels which are determined to be the foreground pixels according to the comparing;
   updating the background model based on a result of the comparing, wherein the updating comprises expanding a range of the reference visual property to include a peripheral video property range when the compared pixel information corresponds to the peripheral video property range, the peripheral video property range representing a visual property range that does not belong to and is adjacent to the range of the reference visual property before the range of the reference visual property is expanded;
   generating at least one background model element candidate comprising pixel information and usage time information of one of the foreground pixels which has a predetermined visual property;

when a number of frames in which one of the at least one background model element candidate is used is greater than a predetermined number, updating the one of the at least one background model element candidate to one of the at least one background model element and deleting a background model element that has not been used for a longest time in the background model; and detects a moving object in a second frame by comparing pixel information of the second frame with the expanded range of the reference visual property.

9. The method of claim 8, wherein the updating comprises deleting a background model element that has not been used at least for a predetermined time period in the background model.

10. The method of claim 8, wherein the updating comprises reducing the peripheral video property range included in the expanded range of the reference visual property by a predetermined rate when no pixels corresponding to the peripheral video property range are detected for a predetermined time period.

11. The method of claim 8, wherein the updating comprises updating the usage time in the at least one background model element according to the compared pixel information.

12. The method of claim 11, wherein the usage time comprises:

a first time element which identifies a most recent frame in which a corresponding background model element is used, a second time element which indicates a number of sequential frames in which the corresponding background model element is not used, and a third time element which indicates a number of frames in which the corresponding background model element is used.

13. The method of claim 8, wherein a number of the at least one background model element is greater than one, and wherein a number of the at least one background model element candidate is smaller than a number of the at least one background model element.

14. The method of claim 8, wherein the reference visual property indicates at least one of brightness, color, and grayscale.

* * * * *